United States Patent [19]

Schneider et al.

[11] Patent Number: 4,856,072
[45] Date of Patent: Aug. 8, 1989

[54] VOICE ACTUATED VEHICLE SECURITY SYSTEM

[75] Inventors: Jack H. Schneider; Larry O. Gray, both of Laurinburg, N.C.

[73] Assignee: Dana Corporation, Toledo, Ohio

[21] Appl. No.: 947,984

[22] Filed: Dec. 31, 1986

[51] Int. Cl.[4] .............................................. H04B 1/00
[52] U.S. Cl. ..................................... 381/86; 381/110; 180/289; 367/198; 340/825.31
[58] Field of Search ........................ 340/52 F, 825.31; 381/110, 86; 455/54, 56, 58; 379/171; 180/287, 289; 367/198

[56] References Cited

U.S. PATENT DOCUMENTS

| | | | |
|---|---|---|---|
| 3,453,390 | 7/1969 | Durkee et al. | 379/170 |
| 3,668,526 | 6/1972 | Raskin | 455/54 |
| 4,450,545 | 5/1984 | Kishi et al. | 340/52 F |
| 4,506,377 | 3/1985 | Kishi et al. | 381/110 |
| 4,593,403 | 6/1986 | Kishi et al. | 381/110 |
| 4,677,429 | 6/1987 | Glotzbach | 340/52 F |

Primary Examiner—Forester W. Isen
Attorney, Agent, or Firm—MacMillan, Sobanski & Todd

[57] ABSTRACT

A voice actuated vehicle security system includes both internal and external microphones for receiving vocal instructions and internal and external speakers for delivering vocal messages. During a training period, a plurality of voice recognition templates are stored in memory representing one or more authorized vehicle operators. A voice recognition and synthesis unit interfaces the microphones and the speakers with a microcomputer and the memory. Various vehicle condition sensors and controls are connected to the microcomputer to permit the system to respond to changes in vehicle conditons by delivering the associated vocal messages and to respond to vocal instructions to control vehicle elements such as door locks, lights, etc.

21 Claims, 5 Drawing Sheets

STATE DIAGRAM DEFINITIONS

VOCAL ANNOUNCEMENT THROUGH SPEAKER

NO VOICE ANNOUNCEMENT

VOCAL INSTRUCTIONS BY OPERATOR WHICH CAUSES SYSTEM TO CHANGE STATES

NON-VOCAL RESPONSE BY OPERATOR OR SENSOR INPUT WHICH CAUSES SYSTEM TO CHANGE STATES

DECISION POINT

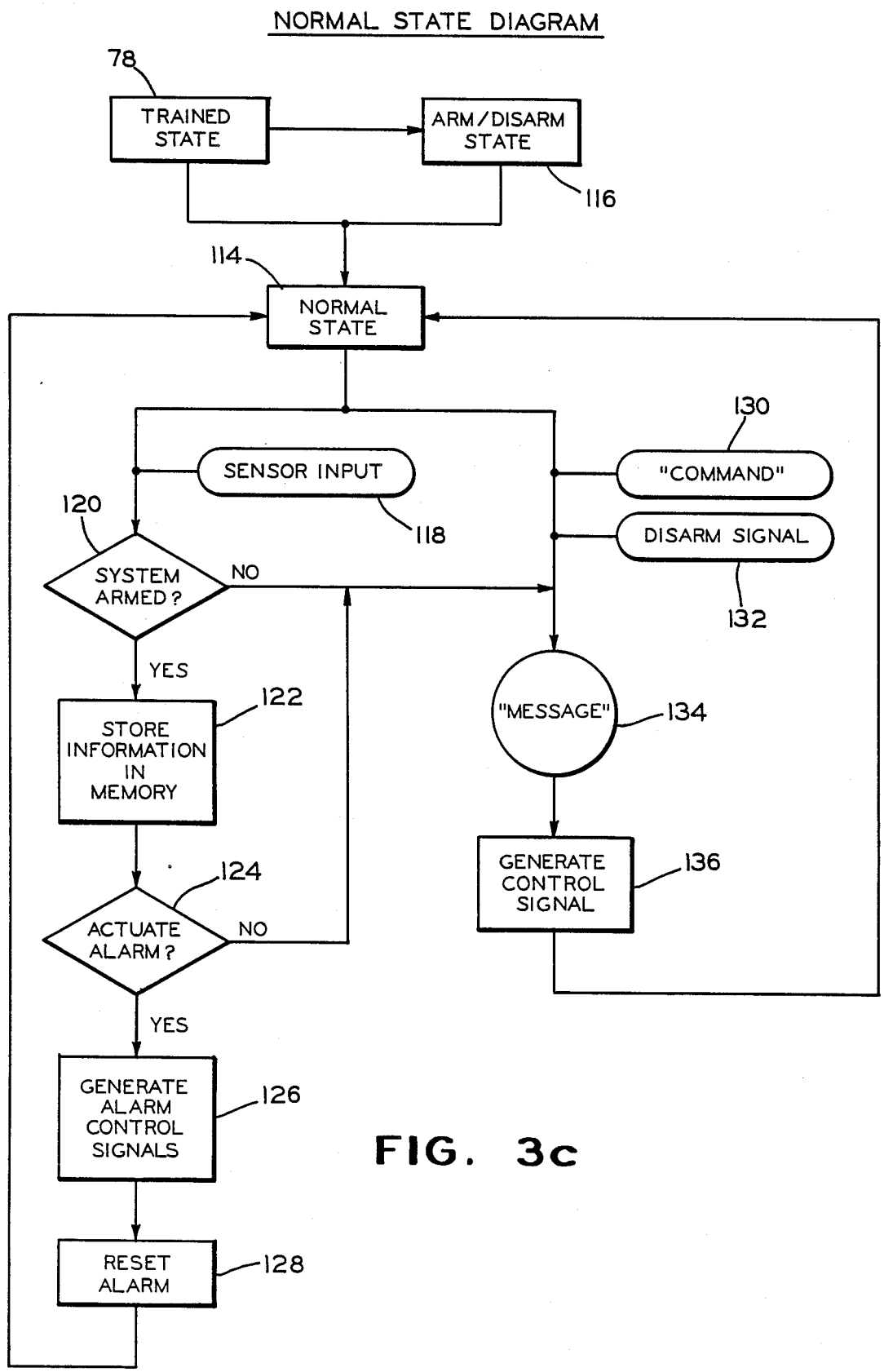

VOICE ACTUATED VEHICLE SECURITY SYSTEM

BACKGROUND OF THE INVENTION

The present invention relates generally to a vehicle security system and, in particular, to a vehicle security system which can be vocally operated by the driver.

In recent years, vehicle security systems have become increasingly popular with automobile drivers as instances of vehicle theft and tampering have increased. While many automobiles include factory-installed security systems, many other automobiles which do not include a factory-installed system have been retrofitted with an after-market security unit.

Conventional security systems are provided with some type of manually actuated control switch which enables the vehicle driver to arm and disarm the operation of the unit. Generally, in a factory installed system, the manually actuated switch is associated with the driver's key actuated door lock in a factory installed system. An after-market system typically requires the installation of a key actuated switch in an exterior body panel, or an interior-mounted switch which must be actuated after a certain time delay. Additionally, the more sophisticated security units include a plurality of push buttons for selecting various modes of operation.

There are numerous voice actuated control systems which have been proposed for use with vehicles. For example, U.S. Pat. No. 4,450,545 discloses a voice responsive door lock system wherein the door lock device is vocally controlled by the driver via a voice recognition unit. The system recognizes an unlocked door and initiates a question as to the necessity for locking the door. The voice recognition unit identifies the driver's reply and produces a door lock command signal for actuating the door lock device.

U.S. Pat. No. 4,501,012 discloses a voice actuated systems for vehicles for controlling the on/off condition of the ratio or air conditioner, and controlling the high/low Beam Status Of The
headlights.

U.S. Pat. No. 4,419,730 discloses a voice actuated system for controlling the temperature setting of a vehicle air conditioning system.

Also, there are also several commercially available systems which utilize synthesized speech for calling the driver's attention to various conditions which exist in a vehicle.

SUMMARY OF THE INVENTION

The present invention concerns a unique vehicle security system which can be voice-actuated by the vehicle operator or any authorized person. The security system includes sensors located at vehicle elements to be monitored such as the hood, doors, light switch, ignition switch, etc. A signal representing the condition of each monitored vehicle element is an input to a microcomputer based control unit. External and internal microphones are utilized to generate signals representing spoken commands which are recognized by a voice recognition and synthesis unit for controlling the security system. Internal and external speakers are also provided for generating spoken messages representing conditions recognized by the security system. The security system includes a unique training program which is utilized initially to store voice template signals corresponding to the selected vocal instructions required to operate the system. The training program utilizes the voice synthesizer for prompting the operator through the training program. When the security system has been armed, it remembers the time and identification of any signals from the sensors. When the system is disarmed, the time and identification of the previously stored interrupts are presented to the vehicle operator. The system will also respond to other operational commands for performing operations which may or may not be associated with security such as unlocking the doors and turning on the lights.

BRIEF DESCRIPTION OF THE DRAWINGS

FIGS. 3a through 3c are state diagrams which illustrate the operation of the present invention.

DESCRIPTION OF THE PREFERRED EMBODIMENT

Figure 1:
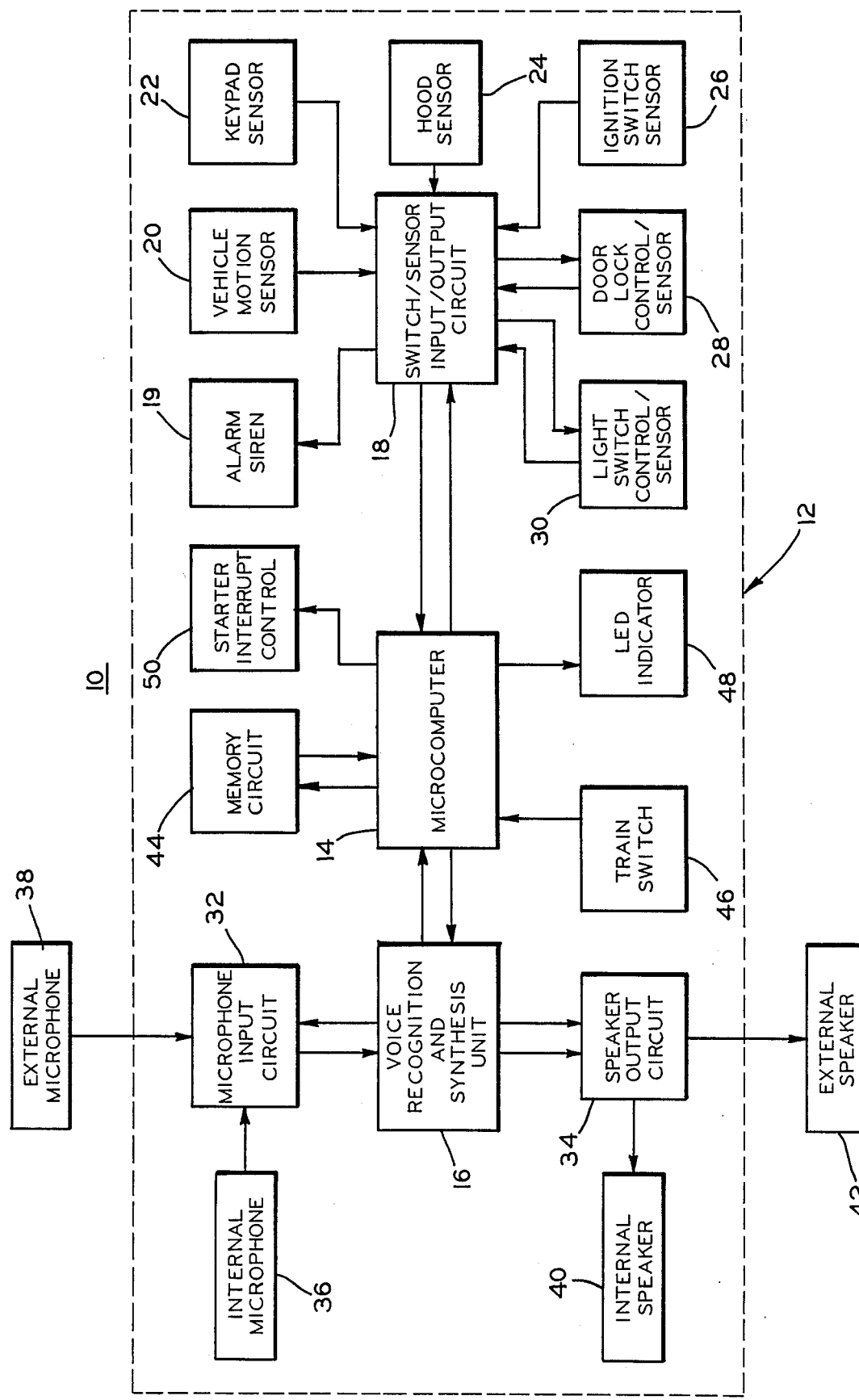
FIG. 1 is a block diagram of a voice actuated security system according to the present invention.

A voice operated vehicle security system 10 is shown in block diagram form in FIG. 1. A dashed line 12 represents a vehicle for which all of the boxes inside the dashed line are internal to the vehicle and all of the boxes outside the dashed line are typically external to the vehicle. The system 10 is controlled by a microcomputer 14 which is connected to a voice control means such as a voice recognition and synthesis unit 16 and a switch/sensor input/output circuit 18. The input/output circuit 18 is connected to receive sensor signals from various switches and sensor means such as a conventional alarm siren 19, a vehicle motion sensor 20, a keypad sensor 22, a hood sensor 24, an ignition switch sensor 26, a door lock control/sensor 28, and a light switch control/sensor 30. The function and operation of these devices will be discussed below.

The voice recognition and synthesis unit 16 is connected to a microphone input circuit 32 and a speaker output circuit 34. The input circuit 32 is connected to an internal microphone 36 and an external microphone 38. The output circuit 34 is connected to an internal speaker 40 and an external speaker 42. The microcomputer 14 is also connected to a memory circuit 44, a train switch 46, and an LED indicator 48.

The voice recognition and synthesis unit 16 receives vocal instructions from an authorized person such as the vehicle operator. The vocal instructions are detected by either the internal microphone 36 or the external microphone 38 and are generated as an input signal to the microphone input circuit 32. The external microphone 38 can either be mounted on an exterior portion of the vehicle, or it can be a remote microphone to be carried by the vehicle driver, and coupled to the input circuit 32 through a suitable transmitter/receiver circuit (not shown). The input circuit 32 can include means for providing the desired filtering of the input signal, for controlling the gain to the input signal, and for converting the analog input signal into a digital form prior to supplying the input signal to the voice recognition and synthesis unit 16. The voice recognition and synthesis unit 16 can also send control signals to the microphone circuit 32. For example, when the authorized individual is in the vehicle, the input circuit 32 could be controlled so as to ignore any input from the external microphone 38. Also, it may be desirous to ignore any input from either of the microphones 36 and 38 when an alarm is being sounded.

The operation of the voice recognition and synthesis unit 16 is controlled by the microcomputer 14 which is connected to generate the required control signals to and receive the required input signals from the switch/sensor input/output circuit 18. The microcomputer 14 is also connected to the memory circuit 44 which is adapted to store the associated voice recognition templates and speech synthesis data. The voice recognition and synthesis unit 16 provides a digital audio output signal to the speaker output circuit 34 which converts the digital output signal to analog form, provides the desired filtering of the signal, and supplies the analog output signal to the internal speaker 40 and/or the external speaker 42. As will be discussed, the speakers 40 and 42 generate alarm signals as well as vocal announcements to inform the operator of the present operating status of the security system. The voice control unit 16 can also generate a control signal to determine which, if either, of the speakers 40 and 42 receives the output signal. The voice control means 16 can be a SP1000 voice recognition/synthesis circuit and the microcomputer 14 can be a VRS1000 microcomputer, both available from General Instrument Corporation.

The microcomputer 14 is connected to the train switch 46 and the LED indicator 48. As will be discussed, the train switch 46 is utilized by the operator to initiate a unique training program wherein selected voice recognition templates are stored in the memory 44. The LED indicator 48 can be used to provide the operator with a visual indication that the system is awaiting a vocal instruction or other command from the operator.

The microcomputer 14 functions to analyze the incoming vocal instructions from the vehicle operator and, if the received instruction corresponds to a selected one of the of the voice recognition templates, generates a selected one of a plurality of separate control signals to the voice recognition and synthesis unit 16, and/or one of the controls such as the light switch control/sensor 30 to turn on or off the vehicle lights, the door lock control/sensor 28 to lock or unlock the doors, and a starter interrupt control 50 to enable or disable the ignition switch or other starter related element. In order to avoid undesirable erroneous operation of the security system as a result of extraneous noise, the voice control unit must receive at least two separate vocal instructions in a predetermined order and within a predetermined time period prior to generating any one of the control signals.

Figure 2:
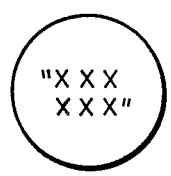
FIG. 2 is a diagram which defines the symbols utilized in the state diagrams of FIGS. 3a through 3c.
Figure 2:
Figure 2:
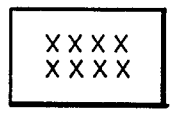
Figure 2:
Figure 2:
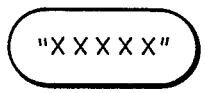
Figure 2:
Figure 2:
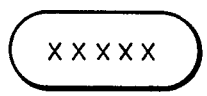
Figure 2:
Figure 2:
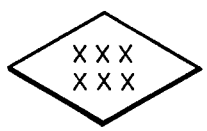
Figure 2:
Figure 2:

The operation of the voice control unit will now be discussed in detail with reference to FIGS. 2 and 3a through 3c. In FIG. 2, there is shown a diagram which defines the symbols utilized in the state diagrams of FIGS. 3a through 3c. As shown in FIG. 2, a circle with a statement in quotes ("xxxxxx") represents a state which, when entered, provides the vehicle operator with a vocal announcement through one of the speakers 40 and 42. A rectangular box indicates a state which, when entered, does not provide a verbal response to the operator. An oval, wherein the written portion therein is contained within quotes ("xxxxx"), represents a vocal instruction by the operator which causes the system to change states. However, an oval wherein the wording therein is not in quotes, represents a non-vocal command by an operator such as, for example, the actuation of the train switch 46 which causes the system to change states. Finally, a diamond-shaped box represents a decision point in the program wherein, depending on the particular operating conditions, the microcomputer 14 causes the system to be routed to a selected one of several different states.

Figure 3A:
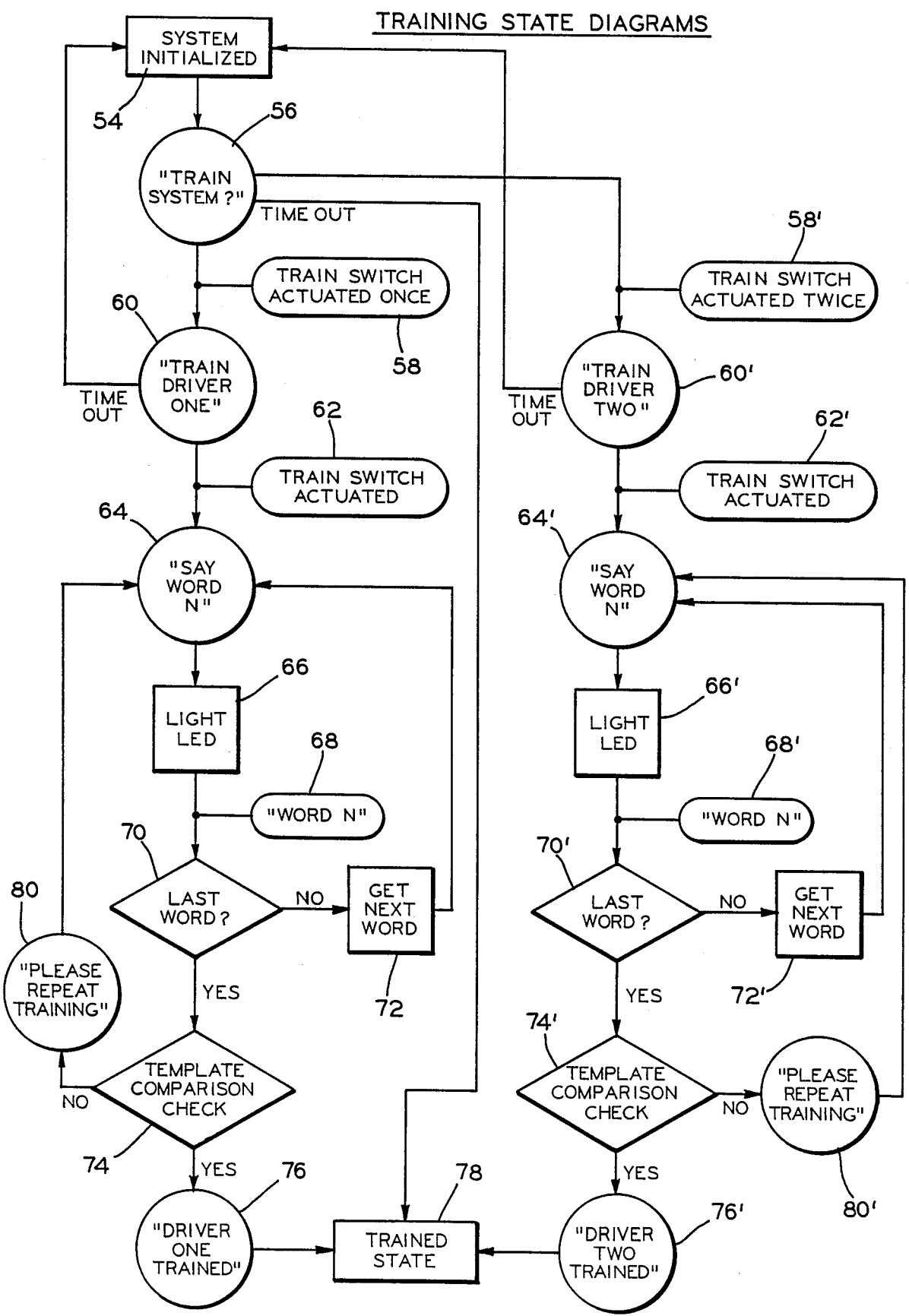

Referring now to FIG. 3a, there is shown a state diagram of the training program which must be performed by the vehicle operator prior to utilizing the voice control unit. The training program instructs the operator to repeat the plurality of instruction phrases which are required to operate the security system. In the preferred embodiment of the invention, the vocal instructions required to operate the system include the phrases "SECURITY SYSTEM", "ARM PLEASE", "ONE, TWO, THREE". As these phrases are spoken by the vehicle operator during the training program, the voice templates generated thereby are stored in the associated memory circuit 44. During the operation of the voice control unit, a vocal instruction received from the operator is converted to a voice template which is subsequently compared to the each of the stored templates to determine which one, if any, corresponds to the template of the received instruction. Upon recognizing correspondence, the appropriate control signal is generated by the microcomputer 14.

The training program of FIG. 3a is initiated at a state 54 wherein the system has been turned on and initialized. The program asks the operator "TRAIN SYSTEM?" at state 56. At this point, in order to proceed through the training program, the vehicle operator momentarily actuates the train switch 46 at instruction 58. This causes the program to enter a state 60 wherein the voice control unit responds to the operator with the phrase "TRAIN DRIVER 1". At this time, the operator must again momentarily actuate the train switch at 62 to cause the system to enter the next state. If the train switch is not actuated again within a predetermined time period, the system times out and returns to the system initialized state 54. However, once the train switch has been actuated the second time, the program enters a state 64 wherein the voice control unit responds with the phrase "SAY WORD N" where "N" represents one of a plurality of operator vocal instructions which must be stored prior to operation of the system. It should be noted that the training program could be designed to enable the driver to choose his own command phrases, particularly the command phrases necessary to disarm the system.

Once the voice control unit has instructed the driver to say a specific word or phrase, the program enters a state 66 wherein the LED indicator 48 is lit. This provides the driver with an indication that the voice control unit is awaiting a response from the driver. At this time, the driver says the word or phrase at 68 as requested by the system. If the word or phrase is not spoken within a particular time period, the program times out to the state wherein the instruction is again given to the operator. Once the driver has spoken the requested word, a voice template representing the spoken word or phrase is stored in the memory circuit 44. The program then enters a decision point 70 to check whether all the required voice templates have been stored by the microcomputer. If the answer is "NO", the program branches to a state 72 wherein the microcomputer retrieves the next word which is to be spoken by the operator by returning to the state 64.

Once all the required voice templates have been stored, the program branches from 70 at "YES" and enters a decision point 74 wherein a comparison is made between all the individual voice templates which have been stored during the training program. If the stored templates are not sufficiently different from one another, this indicates that there may be a problem in the recognition of a particular vocal instruction and the program branches at "NO". Consequently, it is desirable to request the operator to repeat the training sequence at state 80 and the program returns to state 64.

If the stored templates are sufficiently different, the program branches from state 74 at "YES" and a vocal response "DRIVER ONE TRAINED" at 76 is generated before the trained state 78 is entered. Also, if the system has been trained, the operator need only wait at state 56. If the train switch is not actuated, the program will time out and proceed directly to the trained state 78.

The present system can be utilized to train more than one driver. In the event it is desired to train a second driver, the second driver responds to the question "TRAIN SYSTEM?" at 56 by momentarily actuating the train switch 46 twice at 58'. The program then proceeds through a sequence which is similar to the sequence in training the first driver with similar states identified with primed numbers. It should be noted that the system could readily be adapted to train more than two drivers or operators.

Figure 3B:
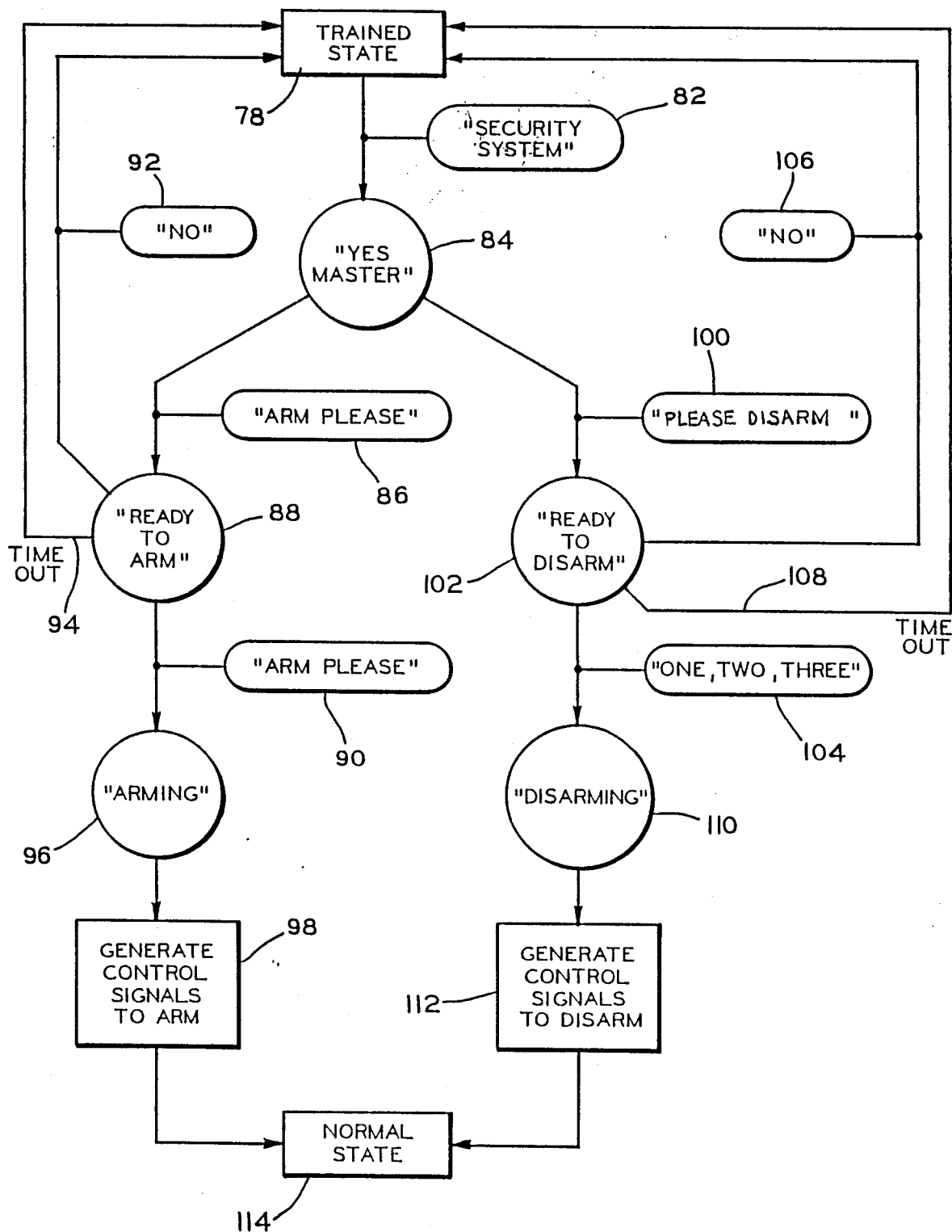

Once the system is in the trained state 78, selected vocal instructions from the vehicle operator corresponding to the stored voice templates can be utilized to control the security system. Referring to FIG. 3b, there is shown the vocal instructions and the associated system responses required to cause the microcomputer 14 to enter either the ARM or the DISARM mode of operation. As shown in FIG. 3b, once the system is in the trained state 78, a vocal instruction "SECURITY SYSTEM" 82 by the operator causes the system to enter a state 84 wherein the voice control unit responds with the phrase "YES MASTER". The operator can select the arm mode with the vocal instruction "ARM PLEASE" 86 and the unit responds "READY TO ARM" at state 88. At this time, in order for the voice control unit to generate the control signals, the operator must again respond with the phrase "ARM PLEASE" at 90 within a predetermined time period. If the operator responds with a "No" at 92, the system returns to the trained state 78. Also, if the operator does not respond with the command "ARM PLEASE" within a predetermined time period, the system times out at 94 to the trained state condition. If, however, the operator responds with the second command "ARM PLEASE" within the allotted time period, the system enters a state 96 and responds with the phrase "ARMING" and then enters a state 98 wherein the microcomputer generates the control signals to arm the security system.

As shown in FIG. 3b, once the system is in the state 84, a vocal instruction "PLEASE DISARM" at 100 by the operator causes the system to enter a state 102 wherein the voice control unit responds with the phrase "READY TO DISARM". At this time, in order to cause the voice control unit to generate the disarm control signals, the operator must respond with a previously stored disarm such as the phrase "ONE, TWO, THREE" at 104 within a predetermined time period. If the operator responds with a "No" at 106, the system returns to the trained state 78. Also, if the operator does not respond with the command "ONE, TWO, THREE" within a predetermined time period, the system times out at 108 to the trained state condition.

If, however, the operator responds with the second command "ONE, TWO, THREE" at 104 within the allotted time period, the system enters a state 110 and responds with the phrase "DISARMING" and then enters a state 112 wherein the microcomputer generates the disarm control signals to disarm the security system. After the control signals have been generated, in either of the states 98 and 112, the program enters normal state 114 wherein the control unit monitors the inputs to the system.

There is shown in FIG. 3c a normal state diagram. The microcomputer enters the normal state 114 either directly from the trained state 78 or through the arm/disarm state 116 after exiting the trained state 78. In the normal state, the system is responsive to a sensor input signal interrupt at 118 generated by one of the system sensors shown in FIG. 1. The system will then enter a decision point 120 to determine whether the system has been armed. If the answer to "SYSTEM ARMED?" is "YES", the system enters a state 122 wherein information concerning the sensor input signal interrupt is stored in the memory circuit 44. For example, an identification of the sensor, the time at which the signal was generated, and the duration of the signal all could be information of the type stored for later use. Sensor interrupts can include sensor interrupt signals from the vehicle motion sensor 20 (indicating the vehicle was moved), from the keypad sensor 22 (an operator entered code to enable the ignition and/or starter), from the hood sensor 24 (the hood was opened), from the ignition switch sensor 26 (position of the switch), from the door lock control/sensor 28 (position of door locks), and from the light switch control/sensor 30 (position of the switch).

The system then enters a decision point "ACTUATE ALARM?" 124 where a check is made to determine if the sensor input was of the type that would require an alarm signal to be generated. If such a signal is to be generated, the system branches at "YES" and enters a state 126 wherein the microprocessor generates alarm control signals. Such control signals are of the type that could be generated through the voice recognition and synthesis unit 16 to actuate the external speaker 42 and/or the internal speaker 40 with siren sounds, or suitable messages such as "STOP THIEF". The system can then enter a state 128 wherein the "RESET ALARM" function is performed after a suitable period of time, such as ten minutes. The system will then return to the normal state 114 and await the next interruption.

Other types of interruptions to the normal state can be a "COMMAND" 130 from the operator or a disarm signal 132 generated during the state 112 shown in FIG. 3b. Either one of these types of interrupts, as well as the sensor input 118 branching at "NO" from the decision point 120 or at "NO" from the decision point 124, will direct the system to a "MESSAGE" state 134 wherein the microcomputer generates a vocal response through the internal speaker 40 and/or the external speaker 42. Typical responses to sensor inputs might be "THE IGNITION IS OFF AND THE LIGHTS ARE ON" or "THE HOOD IS OPEN". Typical "COMMAND" inputs and the corresponding "MESSAGE" might be "OPEN THE DOORS" and "DOORS OPENED". A typical "MESSAGE" response to a disarm signal would be a report of sensor inputs received during the armed state as discussed above or an "ALL CLEAR" if no interruptions had occurred. After the "MESSAGE" has been delivered, the system will enter a state 136 where it generates any associated control signal, such as a signal to lock or unlock the doors to door lock control/sensor 28, to turn on or off the lights to light switch control/sensor 30, and to interrupt or connect the ignition circuit to starter interrupt control 50. The system will then return to the normal state 114 and await the next interrupt.

The vehicle security system according to the present invention is easier to utilize than conventional vehicle security systems since, not only are a key and/or a multiplicity of control buttons eliminated, but the number of functions which can be performed by the system are greatly increased. Furthermore, the system is more secure since it recognizes only the voice or voices that were provided during training.

In accordance with the provisions of the patent statutes, the present invention has been described in what is considered to represent its preferred embodiment. However, it should be noted that the invention can be practiced otherwise than as specifically illustrated and described without departing the scope of the attached claims.

What is claimed is:

1. A voice actuated vehicle security system comprising:
    a first microphone adapted to be mounted inside a vehicle and responsive to a vocal instruction for generating an input signal;
    a second microphone adapted to be mounted outside a vehicle and responsive to said vocal instruction for generating said input signal;
    voice control means connected to said first and second microphones and responsive to said input signal for generating a vocal instruction signal;
    storage means connected to said voice control means for generating a control signal in response to a correspondence between said vocal instruction signal and one of a plurality of stored voice recognition templates; and
    speaker means connected to said voice control means and responsive to an output signal for generating a vocal message, said voice control means being responsive to said control signal for generating said output signal.

2. The system according to claim 1 wherein said speaker means includes a first speaker adapted to be mounted inside a vehicle and connected to said voice control means and a second speaker adapted to be mounted outside a vehicle and connected to said voice control means, said first and second speakers being responsive to said output signal for generating said vocal message.

3. The system according to claim 1 wherein said voice control means includes a voice recognition and synthesis means for converting said input signal in analog form to said vocal instruction signal in digital form.

4. The system according to claim 1 wherein said storage means includes a memory means for storing said voice recognition templates and a microcomputer connected between said voice control means and said memory means, said microcomputer being responsive to said vocal instruction signal for comparing said vocal instruction signal with each of said voice recognition templates and for generating said control signal in response to a correspondence between said vocal instruction signal and one of said plurality of voice recognition templates.

5. The system according to claim 1 wherein said storage means is responsive to a sensor input signal and said vocal instruction signal for generating said control signal to said voice control means and including sensor means adapted to be mounted on a vehicle and responsive to a vehicle condition for generating said sensor input signal.

6. The system according to claim 5 wherein said sensor means is adapted to be operably connected to an ignition switch of a vehicle and is responsive to a predetermined vocal instruction at one of said first and second microphones to enable said ignition switch.

7. The system according to claim 6 wherein said sensor means includes a manually operable keypad means for generating a predetermined sensor input signal to said storage means to enable said ignition switch.

8. The system according to claim 1 wherein said storage means stores an indicia of actuation of said sensor means and is responsive to prior actuation of said sensor means and to said vocal instruction signal for generating said control signal and wherein said vocal message includes said indicia of actuation of said sensor means.

9. The system according to claim 8 wherein said storage means stores a record of a time of actuation of said sensor means and said vocal message includes an indication of the time of actuation of said sensor means.

10. A voice actuated vehicle security system comprising:
    voice control means responsive to an input signal for generating a vocal instruction signal and responsive to a control signal for generating an output signal;
    a first voice responsive means adapted to be mounted outside a vehicle and connected to said voice control means and responsive to a vocal instruction for generating said input signal;
    a second voice responsive means adapted to be mounted inside a vehicle and connected to said voice control means and responsive to said vocal instruction for generating said input signal;
    a first vocal message means connected to said voice control means and adapted to be mounted outside a vehicle and responsive to said output signal for generating a vocal message;
    a second vocal message means connected to said voice control means and adapted to be mounted inside a vehicle and responsive to said output signal for generating said vocal message; and
    storage means connected to said voice control means and responsive to said vocal instruction signal for generating said control signal.

11. The system according to claim 10 wherein said vocal instruction represents an operator request to enter an armed mode of operation, said vocal message represents a response to a predetermined vehicle condition occurring during the armed mode of operation, and said storage means is connected to sensor means, said sensor means generating a sensor signal in response to sensing said predetermined vehicle condition and said storage means generating said control signal in response to said sensor signal.

12. The system according to claim 10 wherein said first and second voice responsive means are microphones.

13. The system according to claim 12 including a microphone input circuit connected between said voice control means and said first and second microphones for passing said input signal and for selectively blocking said input signal in response to a circuit control signal generated by said voice control means.

14. The system according to claim 10 wherein said first and second voice responsive means are microphones, said first and second vocal message means are speakers and said voice control means is a voice recognition and synthesis unit.

15. The system according to claim 10 wherein said first and second vocal message means are speakers.

16. The system according to claim 15 including a speaker output circuit connected between said voice control means and said first and second speakers for passing said output signal and for selectively blocking said output signal in response to a circuit control signal generated by said voice control means.

17. The system according to claim 10 wherein said vocal instruction includes a first vocal instruction and said vocal message includes a first vocal message associated with said first vocal instruction and indicating that said first vocal instruction has been received by said voice control means.

18. The system according to claim 17 wherein said vocal instruction includes a second vocal instruction and said storage means is responsive to said second vocal instruction to enter an armed mode of operation only when said second vocal instruction is received by said voice control means within a predetermined time after said first vocal instruction is received.

19. The system according to claim 18 wherein said vocal message includes a second vocal message indicating that said armed mode of operation has been entered.

20. The system according to claim 10 wherein said storage means includes a memory circuit for storing a plurality of voice recognition templates including at least two sets of vocal instructions for two different vehicle operators.

21. A voice actuated vehicle security system comprising:
a first microphone adapted to be mounted outside a vehicle and responsive to a vocal instruction for generating an input signal;
a second microphone adapted to be mounted inside a vehicle and responsive to said vocal instruction for generating said input signal;
a first speaker adapted to be mounted outside a vehicle and responsive to an output signal for generating a vocal message;
a second speaker adapted to be mounted inside a vehicle and responsive to said output signal for generating said vocal message;
a voice control means connected to said first and second microphones and to said first and second speakers and responsive to said input signal for generating a vocal instruction signal and responsive to a control signal for generating said output signal;
a memory circuit for storing voice recognition templates;
a microcomputer connected to said memory circuit and to said voice control means and responsive to at least one of a correspondence between said voice instruction signal and one of said voice recognition templates and a sensor signal for generating said control signal; and
a sensor means for generating said sensor signal in response to a predetermined vehicle condition.

* * * * *